US012587032B2

(12) United States Patent
Ghatak et al.

(10) Patent No.: US 12,587,032 B2
(45) Date of Patent: Mar. 24, 2026

(54) INTELLIGENT WIRELESS ENERGY SHARING

(71) Applicant: International Business Machines Corporation, Armonk, NY (US)

(72) Inventors: Sumitro Ghatak, Kolkata (IN); Sanmitra Sarkar, Kolkata (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 18/328,966

(22) Filed: Jun. 5, 2023

(65) Prior Publication Data

US 2024/0405604 A1     Dec. 5, 2024

(51) Int. Cl.
 *G05B 13/02*          (2006.01)
 *B60L 53/12*          (2019.01)
          (Continued)

(52) U.S. Cl.
 CPC .......... *H02J 13/1331* (2026.01); *B60L 53/12* (2019.02); *B60L 53/60* (2019.02); *B60L 55/00* (2019.02);
          (Continued)

(58) Field of Classification Search
 CPC ..... H02J 13/00022; H02J 50/40; B60L 53/12; B60L 53/60; B60L 55/00; B60L 53/126; B60L 53/66; G05B 13/0265; H04W 84/18
 See application file for complete search history.

(56) References Cited

U.S. PATENT DOCUMENTS 8,432,131 B2     4/2013  Lowenthal et al.
8,975,864 B2     3/2015  Kim
          (Continued)

FOREIGN PATENT DOCUMENTS

CN        208290988 U     12/2018
JP        2013097593 A  *  5/2013   ........... G06F 3/0488
          (Continued)

OTHER PUBLICATIONS

Lyu Cheng et al: "Fully decentralized peer-to-peer energy sharing framework for smart buildings with local battery system and aggregated electric vehicles", Applied Energy, Elsevier Science Publishers, GB, vol. 299, Jun. 25, 2021 (Jun. 25, 2021), XP086728591, ISSN: 0306-2619, DOI: 10.1016/J.APENERGY.2021.117243 [retrieved on Jun. 25, 2021].
          (Continued)

*Primary Examiner* — Santosh R Poudel
(74) *Attorney, Agent, or Firm* — Yee & Associates, P.C.

(57)          ABSTRACT

Intelligent wireless energy sharing is provided. An ad hoc wireless mesh network that includes a plurality of energy nodes is formed using a set of machine learning models. The plurality of energy nodes is comprised of the energy node and a set of other energy nodes. A source energy node and a sink energy node in the plurality of energy nodes is identified using the set of machine learning models in response to forming the ad hoc wireless mesh network. Energy is wirelessly transferred from the energy node as the source energy node to the sink energy node via the ad hoc wireless mesh network utilizing a transceiver.

14 Claims, 10 Drawing Sheets

(51) Int. Cl.

| | |
|---|---|
| *B60L 53/60* | (2019.01) |
| *B60L 55/00* | (2019.01) |
| *H02J 13/13* | (2026.01) |
| *H02J 50/40* | (2016.01) |
| *H04W 84/18* | (2009.01) |

(52) U.S. Cl.
CPC .......... *G05B 13/0265* (2013.01); *H02J 50/40* (2016.02); *H04W 84/18* (2013.01)

(56) References Cited

U.S. PATENT DOCUMENTS

| | | | |
|---|---|---|---|
| 2013/0204471 A1* | 8/2013 | O'Connell | B60L 53/68 |
| | | | 701/22 |
| 2014/0022917 A1* | 1/2014 | Apte | H05B 47/11 |
| | | | 370/252 |
| 2016/0129793 A1* | 5/2016 | Cronie | H02J 50/90 |
| | | | 320/109 |
| 2016/0352156 A1* | 12/2016 | Desai | H02J 50/12 |
| 2017/0230144 A1* | 8/2017 | Wu | H03M 13/3761 |
| 2018/0105054 A1 | 4/2018 | Fan et al. | |
| 2020/0282857 A1 | 9/2020 | Mortensen et al. | |
| 2021/0257862 A1* | 8/2021 | Muratov | H02J 50/60 |
| 2021/0323420 A1 | 10/2021 | Lu | |
| 2023/0015182 A1 | 1/2023 | Shune et al. | |

| | | | |
|---|---|---|---|
| 2023/0216355 A1* | 7/2023 | Bodurka | H02J 50/20 |
| | | | 307/104 |
| 2024/0120743 A1* | 4/2024 | Woods | H02J 3/14 |

FOREIGN PATENT DOCUMENTS

| | | | | |
|---|---|---|---|---|
| KR | 20220081884 A * | 6/2022 | ............. | H02J 50/20 |
| WO | 2016020645 A1 | 2/2016 | | |
| WO | 2017209735 A1 | 12/2017 | | |
| WO | 2017209736 A1 | 12/2017 | | |
| WO | 2024/251529 A1 | 12/2024 | | |

OTHER PUBLICATIONS

PCT International Search Report and Written Opinion, dated Jul. 3, 2024, regarding Application No. PCT/EP2024/064213, 15 pages.

Adil et al., "A Reliable Sensor Network Infrastructure for Electric Vehicles to Enable Dynamic Wireless Charging Based on Machine Learning Technique," IEEE Access, vol. 8, Oct. 14, 2020, 15 pages. https://ieeexplore.ieee.org/document/9223665.

Mou et al., "Vehicle-to-Vehicle charging system fundamental and design comparison, " 2019 IEEE International Conference on Industrial Technology (ICIT), Feb. 13-15, 2019, Melbourne, VIC, Australia, 6 pages. https://ieeexplore.ieee.org/document/8755057.

Shahriar et al., "Prediction of EV Charging Behavior Using Machine Learning," IEEE Access, vol. 9, Aug. 6, 2021, 12 pages. https://ieeexplore.ieee.org/document/9508419.

\* cited by examiner

COMPUTING ENVIRONMENT
100

FIG. 1

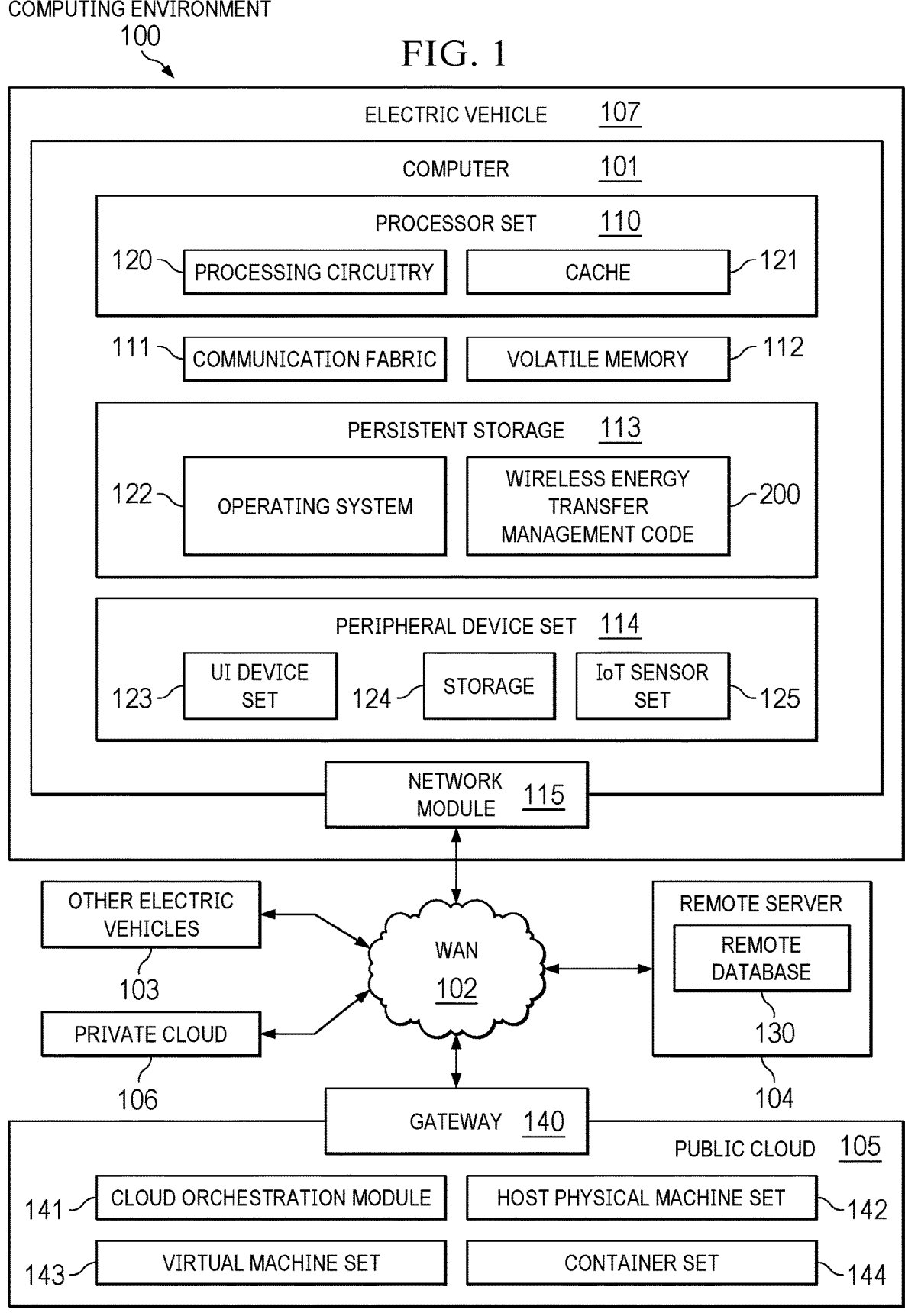

ELECTRIC VEHICLE　107

COMPUTER　101

PROCESSOR SET　110

120 — PROCESSING CIRCUITRY

CACHE — 121

111 — COMMUNICATION FABRIC

VOLATILE MEMORY — 112

PERSISTENT STORAGE　113

122 — OPERATING SYSTEM

WIRELESS ENERGY TRANSFER MANAGEMENT CODE — 200

PERIPHERAL DEVICE SET　114

123 — UI DEVICE SET

124 — STORAGE

IoT SENSOR SET — 125

NETWORK MODULE　115

OTHER ELECTRIC VEHICLES
103

PRIVATE CLOUD
106

WAN
102

REMOTE SERVER

REMOTE DATABASE
130

104

GATEWAY　140

PUBLIC CLOUD　105

141 — CLOUD ORCHESTRATION MODULE

HOST PHYSICAL MACHINE SET — 142

143 — VIRTUAL MACHINE SET

CONTAINER SET — 144

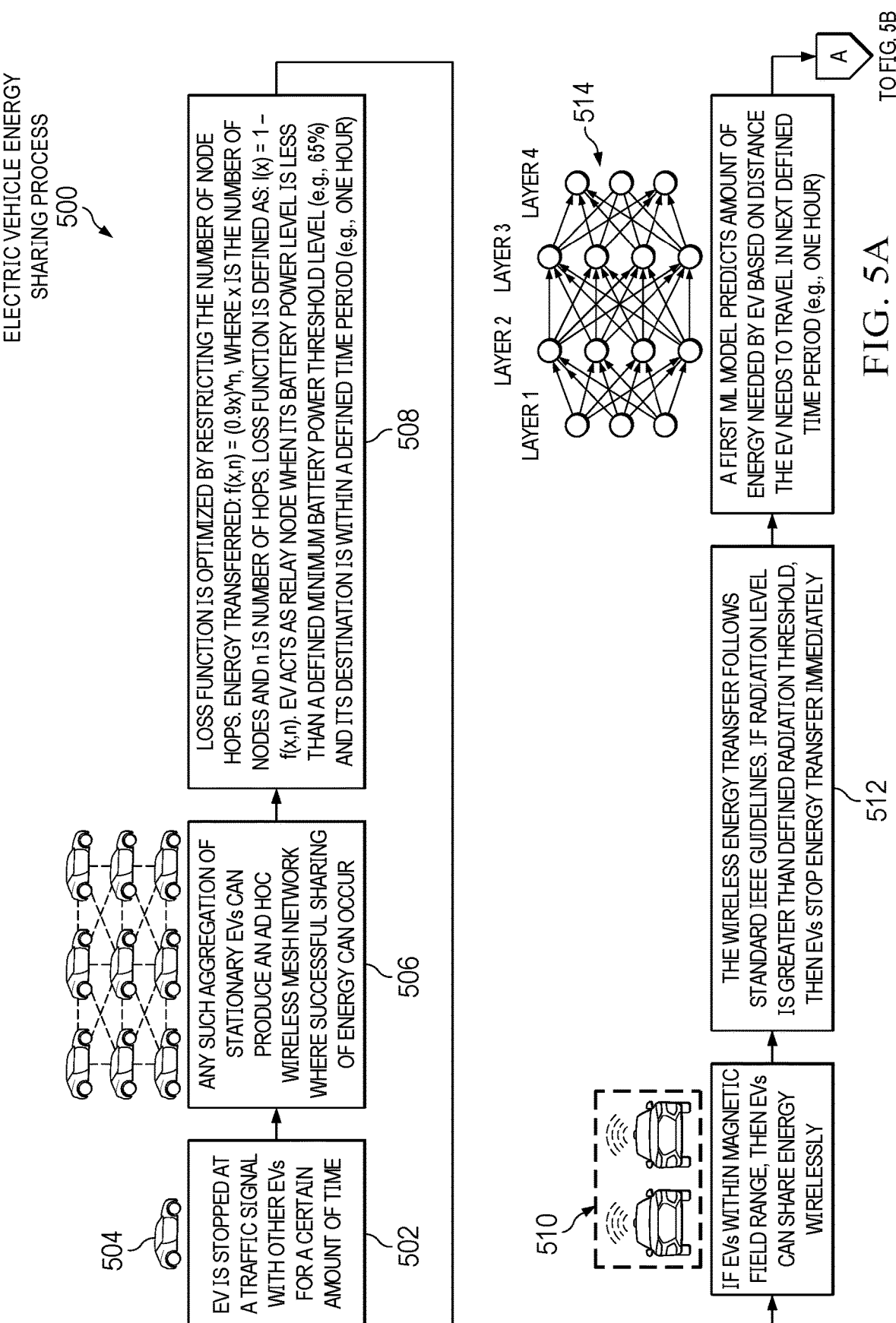

ELECTRIC VEHICLE ENERGY SHARING PROCESS 500

EV IS STOPPED AT A TRAFFIC SIGNAL WITH OTHER EVs FOR A CERTAIN AMOUNT OF TIME
504

ANY SUCH AGGREGATION OF STATIONARY EVs CAN PRODUCE AN AD HOC WIRELESS MESH NETWORK WHERE SUCCESSFUL SHARING OF ENERGY CAN OCCUR
506

LOSS FUNCTION IS OPTIMIZED BY RESTRICTING THE NUMBER OF NODE HOPS. ENERGY TRANSFERRED: $f(x,n) = (0.9x)^n$, WHERE x IS THE NUMBER OF NODES AND n IS NUMBER OF HOPS. LOSS FUNCTION IS DEFINED AS: $l(x) = 1 - f(x,n)$. EV ACTS AS RELAY NODE WHEN ITS BATTERY POWER LEVEL IS LESS THAN A DEFINED MINIMUM BATTERY POWER THRESHOLD LEVEL (e.g., 65%) AND ITS DESTINATION IS WITHIN A DEFINED TIME PERIOD (e.g., ONE HOUR)
508

LAYER 1  LAYER 2  LAYER 3  LAYER 4
514

IF EVs WITHIN MAGNETIC FIELD RANGE, THEN EVs CAN SHARE ENERGY WIRELESSLY
510

THE WIRELESS ENERGY TRANSFER FOLLOWS STANDARD IEEE GUIDELINES. IF RADIATION LEVEL IS GREATER THAN DEFINED RADIATION THRESHOLD, THEN EVs STOP ENERGY TRANSFER IMMEDIATELY
512

A FIRST ML MODEL PREDICTS AMOUNT OF ENERGY NEEDED BY EV BASED ON DISTANCE THE EV NEEDS TO TRAVEL IN NEXT DEFINED TIME PERIOD (e.g., ONE HOUR)

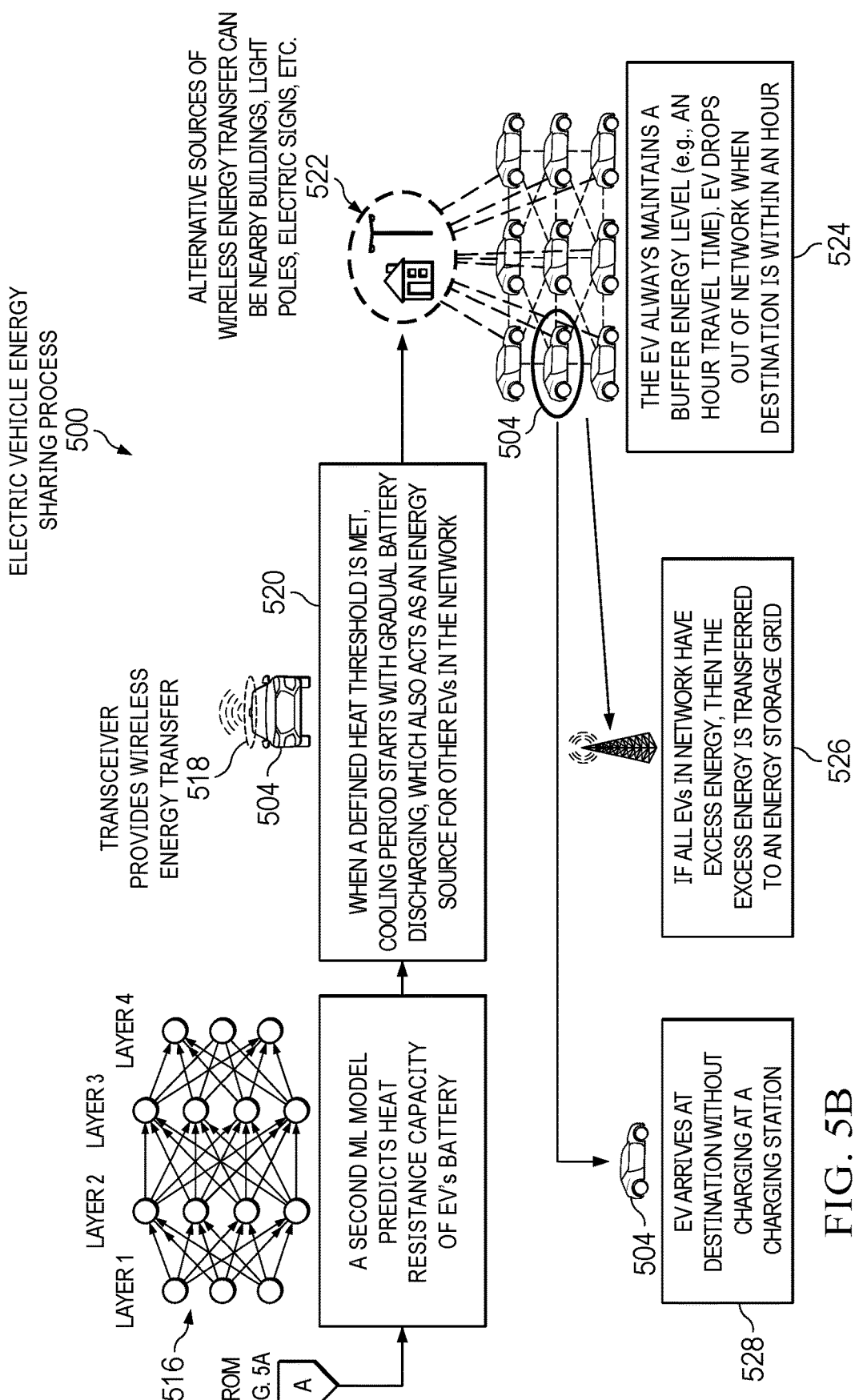

ELECTRIC VEHICLE ENERGY SHARING PROCESS 500

ALTERNATIVE SOURCES OF WIRELESS ENERGY TRANSFER CAN BE NEARBY BUILDINGS, LIGHT POLES, ELECTRIC SIGNS, ETC. 522

THE EV ALWAYS MAINTAINS A BUFFER ENERGY LEVEL (e.g., AN HOUR TRAVEL TIME). EV DROPS OUT OF NETWORK WHEN DESTINATION IS WITHIN AN HOUR 524

504

TRANSCEIVER PROVIDES WIRELESS ENERGY TRANSFER 518

520

504

WHEN A DEFINED HEAT THRESHOLD IS MET, COOLING PERIOD STARTS WITH GRADUAL BATTERY DISCHARGING, WHICH ALSO ACTS AS AN ENERGY SOURCE FOR OTHER EVs IN THE NETWORK

IF ALL EVs IN NETWORK HAVE EXCESS ENERGY, THEN THE EXCESS ENERGY IS TRANSFERRED TO AN ENERGY STORAGE GRID 526

LAYER 1 LAYER 2 LAYER 3 LAYER 4

516

FROM FIG. 5A

A

A SECOND ML MODEL PREDICTS HEAT RESISTANCE CAPACITY OF EV's BATTERY

504

EV ARRIVES AT DESTINATION WITHOUT CHARGING AT A CHARGING STATION

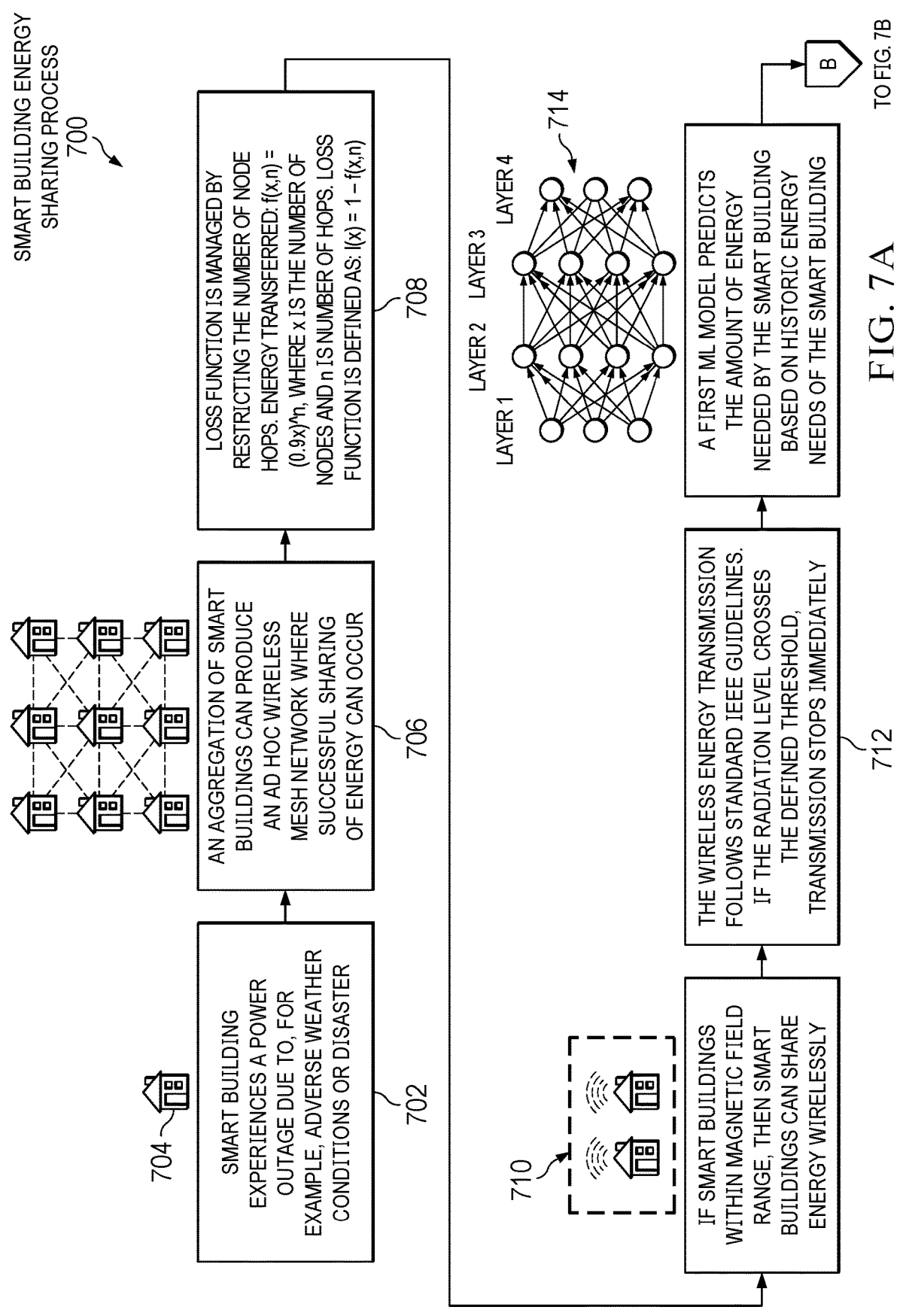

SMART BUILDING ENERGY SHARING PROCESS

700

704

SMART BUILDING EXPERIENCES A POWER OUTAGE DUE TO, FOR EXAMPLE, ADVERSE WEATHER CONDITIONS OR DISASTER

702

AN AGGREGATION OF SMART BUILDINGS CAN PRODUCE AN AD HOC WIRELESS MESH NETWORK WHERE SUCCESSFUL SHARING OF ENERGY CAN OCCUR

706

LOSS FUNCTION IS MANAGED BY RESTRICTING THE NUMBER OF NODE HOPS. ENERGY TRANSFERRED: $f(x,n) = (0.9x)^n$, WHERE x IS THE NUMBER OF NODES AND n IS NUMBER OF HOPS. LOSS FUNCTION IS DEFINED AS: $l(x) = 1 - f(x,n)$

708

LAYER 1  LAYER 2  LAYER 3  LAYER 4

714

710

IF SMART BUILDINGS WITHIN MAGNETIC FIELD RANGE, THEN SMART BUILDINGS CAN SHARE ENERGY WIRELESSLY

THE WIRELESS ENERGY TRANSMISSION FOLLOWS STANDARD IEEE GUIDELINES. IF THE RADIATION LEVEL CROSSES THE DEFINED THRESHOLD, TRANSMISSION STOPS IMMEDIATELY

712

A FIRST ML MODEL PREDICTS THE AMOUNT OF ENERGY NEEDED BY THE SMART BUILDING BASED ON HISTORIC ENERGY NEEDS OF THE SMART BUILDING

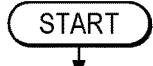

START

802 — FORM, BY A COMPUTER OF AN ENERGY NODE, USING A SET OF MACHINE LEARNING MODELS, AN AD HOC WIRELESS MESH NETWORK THAT INCLUDES A PLURALITY OF ENERGY NODES, THE PLURALITY OF ENERGY NODES IS COMPRISED OF THE ENERGY NODE AND A SET OF OTHER ENERGY NODES AND THE PLURALITY OF ENERGY NODES IS STATIONARY FOR A CERTAIN AMOUNT OF TIME WITHIN A DEFINED RANGE THAT ALLOWS WIRELESS ENERGY TRANSFER

804 — IDENTIFY, BY THE COMPUTER OF THE ENERGY NODE, USING THE SET OF MACHINE LEARNING MODELS, A SOURCE ENERGY NODE AND A SINK ENERGY NODE IN THE PLURALITY OF ENERGY NODES BASED ON AT LEAST ONE OF A DISTANCE THE ENERGY NODE NEEDS TO TRAVEL IN A PREDEFINED TIME PERIOD, CURRENT ENERGY LEVEL OF THE ENERGY NODE, CURRENT ENERGY LEVELS OF THE SET OF OTHER ENERGY NODES, HEAT RESISTANCE CAPACITY OF EACH OF THE PLURALITY OF ENERGY NODES, AND AN AMOUNT OF ENERGY LOSS DURING THE WIRELESS ENERGY TRANSFER, THE SOURCE ENERGY NODE IS THE ENERGY NODE HAVING ITS CURRENT ENERGY LEVEL GREATER THAN A DEFINED MINIMUM ENERGY THRESHOLD LEVEL AND THE SINK ENERGY NODE IS ONE OF THE SET OF OTHER ENERGY NODES HAVING ITS CURRENT ENERGY LEVEL LESS THAN THE DEFINED MINIMUM ENERGY THRESHOLD LEVEL

806 — IDENTIFY, BY THE COMPUTER OF THE ENERGY NODE, USING THE SET OF MACHINE LEARNING MODELS, A SET OF RELAY ENERGY NODES ACTING AS AN ENERGY RELAY BETWEEN THE ENERGY NODE AS THE SOURCE ENERGY NODE AND THE SINK ENERGY NODE IN THE PLURALITY OF ENERGY NODES TO WIRELESSLY TRANSFER ENERGY FROM THE ENERGY NODE AS THE SOURCE ENERGY NODE TO THE SINK ENERGY NODE, THE SET OF RELAY ENERGY NODES HAVING CURRENT ENERGY LEVELS LESS THAN THE DEFINED MINIMUM ENERGY THRESHOLD LEVEL AND TRAVEL DESTINATIONS WITHIN THE PREDEFINED TIME PERIOD, THE COMPUTER OF THE ENERGY NODE UTILIZING AN ENERGY TRANSFER LOSS FUNCTION TO RESTRICT A NUMBER OF THE SET OF RELAY ENERGY NODES

808 — TRANSFER, BY THE COMPUTER OF THE ENERGY NODE, UTILIZING A TRANSCEIVER, THE ENERGY WIRELESSLY FROM THE ENERGY NODE AS THE SOURCE ENERGY NODE TO THE SINK ENERGY NODE VIA THE AD HOC WIRELESS MESH NETWORK USING THE SET OF RELAY ENERGY NODES

810 — DETECT, BY THE COMPUTER OF THE ENERGY NODE, USING A RADIATION SENSOR, THAT AN ELECTROMAGNETIC RADIATION LEVEL IS GREATER THAN A DEFINED MAXIMUM ELECTROMAGNETIC RADIATION THRESHOLD LEVEL WHILE WIRELESSLY TRANSFERRING THE ENERGY FROM THE ENERGY NODE AS THE SOURCE ENERGY NODE TO THE SINK ENERGY NODE

812 — STOP, BY THE COMPUTER OF THE ENERGY NODE, THE WIRELESS ENERGY TRANSFER FROM THE ENERGY NODE AS THE SOURCE ENERGY NODE TO THE SINK ENERGY NODE IN RESPONSE TO DETECTING THAT THE ELECTROMAGNETIC RADIATION IS GREATER THAN THE DEFINED MAXIMUM ELECTROMAGNETIC RADIATION THRESHOLD LEVEL

END

FIG. 8

INTELLIGENT WIRELESS ENERGY SHARING

BACKGROUND

The disclosure relates generally to electric vehicles and more specifically to intelligent wireless energy sharing among electric vehicles.

Today, many battery-powered devices allow recharging without physical connection to a power supply. Wireless energy transfer is a generic term for a number of different technologies for transmitting power by means of electromagnetic fields. For example, wireless energy transfer (also known as wireless power transmission, electromagnetic power transfer, or the like) is the conveyance or transmission of electrical energy without wires as a physical link to an electrical source. In a wireless energy transfer system, a transmitter device generates an electromagnetic field, which transmits power across space to a receiver device, which extracts power from the electromagnetic field and supplies it to a battery or an electrical load, such as, for example, a light, appliance, or the like. In near field wireless energy transfer, power is transferred over short distances by the electromagnetic field using inductive coupling between electrical coils of wire. Wireless energy transfer is useful to power electrical devices where interconnecting wires are, for example, not possible, inconvenient, hazardous, or the like.

SUMMARY

According to one illustrative embodiment, a computer-implemented method for intelligent wireless energy sharing is provided. A computer of an energy node, using a set of machine learning models, forms an ad hoc wireless mesh network that includes a plurality of energy nodes. The plurality of energy nodes is comprised of the energy node and a set of other energy nodes. The computer of the energy node, using the set of machine learning models, identifies a source energy node and a sink energy node in the plurality of energy nodes in response to forming the ad hoc wireless mesh network. The computer of the energy node, utilizing a transceiver, transfers energy wirelessly from the energy node as the source energy node to the sink energy node via the ad hoc wireless mesh network. According to other illustrative embodiments, a computer system and computer program product for intelligent wireless energy sharing are provided.

BRIEF DESCRIPTION OF THE DRAWINGS

FIG. 1 is a pictorial representation of a computing environment in which
illustrative embodiments may be implemented;
FIGS. 5A-5B are a diagram illustrating an example of an electric vehicle energy sharing process in accordance with an illustrative embodiment;

FIGS. 7A-7B are a diagram illustrating an example of a smart building energy sharing process in accordance with an illustrative embodiment;
and
FIG. 8 is a flowchart illustrating a process for intelligent wireless energy sharing in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
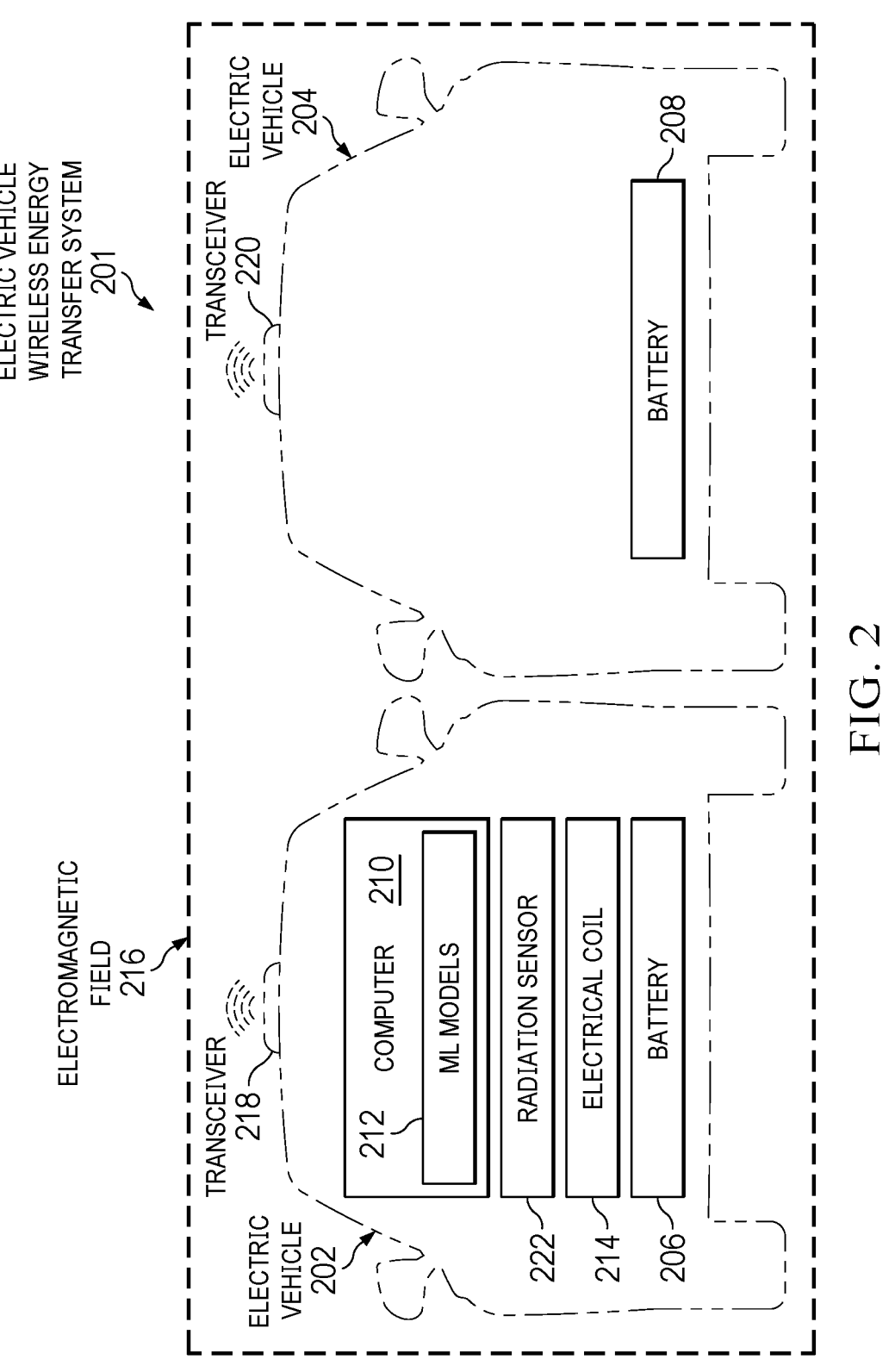
FIG. 2 is a diagram illustrating an example of an electric vehicle wireless energy transfer system in accordance with an illustrative embodiment.
Figure 6:
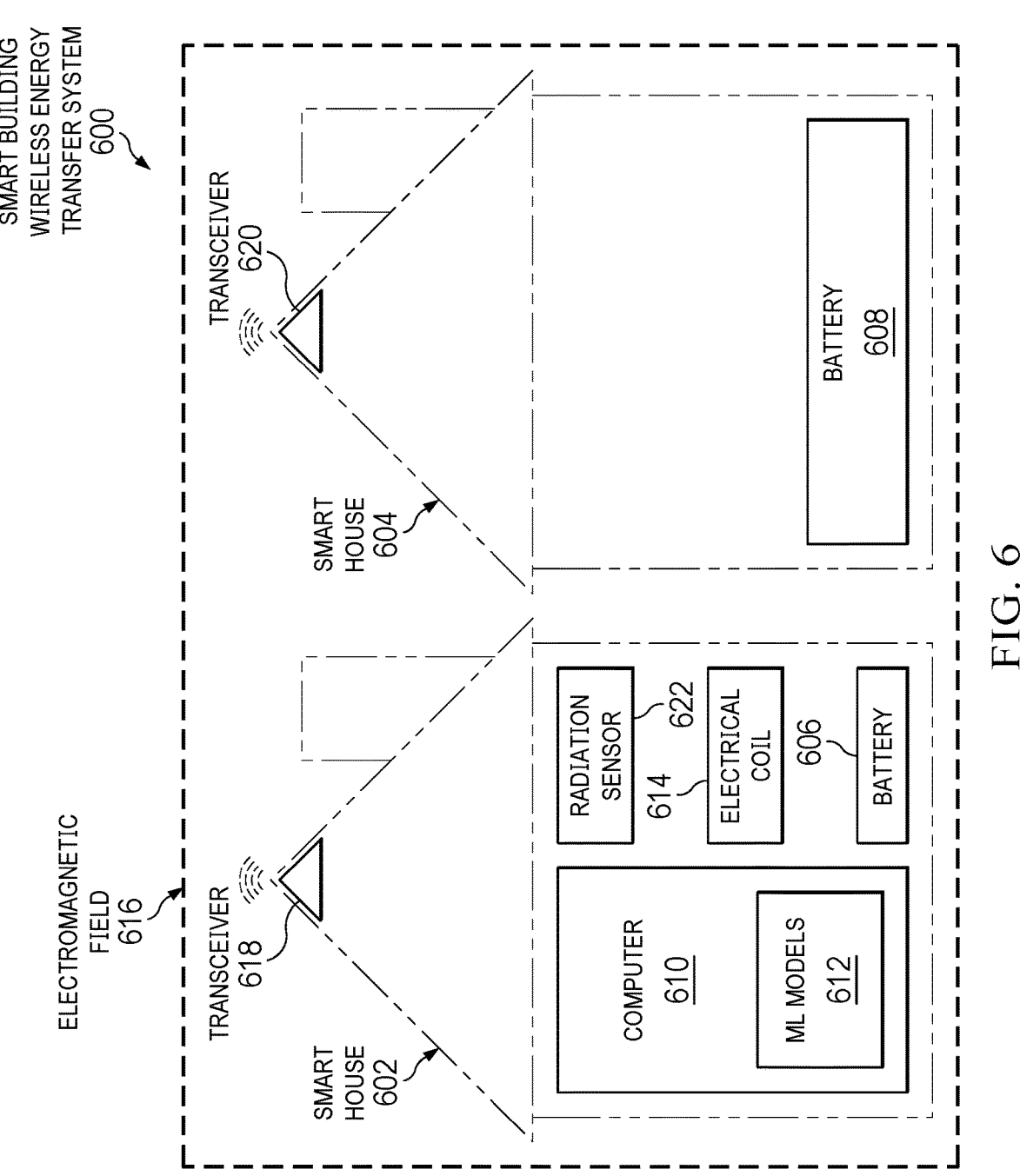
FIG. 6 is a diagram illustrating an example of a smart building wireless energy transfer system in accordance with an illustrative embodiment.

With reference now to the figures, and in particular, with reference to FIG. 1, FIG. 2, and FIG. 6, diagrams of data processing environments are provided in which illustrative embodiments may be implemented. It should be appreciated that FIG. 1, FIG. 2, and FIG. 6 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as wireless energy transfer management code 200.

For example, wireless energy transfer management code 200 can establish an ad hoc wireless mesh network with a plurality of nodes (e.g., electrics vehicles or smart buildings) that have batteries. Once wireless energy transfer management code 200 establishes an ad hoc wireless mesh network, nodes within range of an electromagnetic field generated by respective nodes can wirelessly share energy as per the needs of other nodes within the ad hoc wireless mesh network. For example, when nodes of the ad hoc wireless mesh network are within a defined range or distance, wireless energy transfer management code 200 utilizes an electrical coil to generate an alternating electromagnetic field, thereby enabling wireless energy transfer to neighboring nodes in the network. Each of the nodes of the ad hoc wireless mesh network can also act as a relay node, thereby enabling the wireless energy transfer to hop from one particular node to another node. For example, nodes should maintain a battery power level greater than a defined minimum battery power threshold level (e.g., greater than 65%) in order to transfer energy wirelessly (transmit).

Wireless energy transfer management code 200 stops wireless energy transfer when the battery power level of a node falls below the defined minimum battery power threshold level. In addition, when an electric vehicle node has a battery power level less than the defined minimum battery power threshold level and the electric vehicle's travel destination is within a predefined time period (e.g., one hour), wireless energy transfer management code 200 prevents that particular electric vehicle from wirelessly absorbing any further energy from neighboring nodes in the ad hoc wireless mesh network and only allows that particular electric vehicle to act as a relay node. In addition, wireless energy transfer management code 200 utilizes an energy transfer loss function to manage energy loss during the wireless energy transfer by restricting the number of energy transfer hops between nodes in the ad hoc wireless mesh network.

This wireless energy sharing in an ad-hoc manner by wireless energy transfer management code 200 can prevent an electric vehicle from running out of battery charge while traveling during a trip without utilizing a wired charging station. Further, this wireless energy sharing by wireless energy transfer management code 200 can prevent power outages in smart buildings during, for example, severe weather, disaster, or the like.

In addition to wireless energy transfer management code 200, computing environment 100 includes, for example, computer 101, wide area network (WAN) 102, other electric vehicles 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and wireless energy transfer management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

In this example, computer 101 is located in electric vehicle 107. However, in an alternative illustrative embodiment, computer 101 can be located in a smart building. Computer 101 may take the form of any type of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in wireless energy transfer management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The wireless energy transfer management code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

Other electric vehicles 103 represent a plurality of other electric vehicles similar to electric vehicle 107. In addition, each electric vehicle of other electric vehicles 103 includes a computer similar to computer 101 containing wireless energy transfer management code 200. Electric vehicle 107 and other electric vehicles 103 receive helpful and useful data from the operations of computer 101 for intelligent wireless energy sharing.

Remote server 104 is any computer system that serves at least some data and/or functionality to computer 101. Remote server 104 represents the machine(s) that collect and store helpful and useful data for use by other computers, such as computer 101. For example, in a hypothetical case where computer 101 is designed and programmed to make predictions based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Currently, various infrastructures exist for charging electric vehicles. These electric vehicles can be charged either at home or at a remote charging station using a wired connection. However, there may be an occasion when an electric vehicle runs out of battery charge while traveling during a trip or journey. Electric vehicles are not capable of storing additional energy, which can be used in case of emergency. Currently, no solution exists to wirelessly transfer energy between electric vehicles or smart buildings during a time of battery power shortage or power outage in an ad hoc manner.

For example, vehicles are often stopped at traffic signals, road construction, road closures due to accidents, parking lots, and the like, for certain amounts of time. Any such aggregation of stationary vehicles can give rise to an ad hoc wireless mesh network where sharing of energy can occur. If electric vehicles were able to wirelessly share energy, then electric vehicles may be a more viable option for people to purchase.

Illustrative embodiments utilize one machine learning model to predict the amount of energy needed by an electric vehicle during a user-specified trip based on the distance the electric vehicle needs to travel in a predefined time period (e.g., one hour). Illustrative embodiments also utilize another machine learning model to predict the heat resistance capacity of the electric vehicle's battery. In other words, illustrative embodiments want to prevent overheating of the battery of the electric vehicle, which can cause damage to the battery or other components. If illustrative embodiments predict that the battery of the electric vehicle will exceed a defined maximum battery heat threshold level, then illustrative embodiments start a gradual energy discharge from the battery during a cooling period, which can also act as an energy source for other electric vehicles comprising the ad hoc wireless mesh network.

In addition, an issue associated with wireless energy transfer is limiting exposure of people to potentially injurious electromagnetic radiation. The wireless energy transfer of illustrative embodiments follows Institute of Electrical and Electronics Engineers (IEEE) standard guidelines. If illustrative embodiments detect that an electromagnetic radiation level is greater than a defined maximum electromagnetic radiation threshold level, then illustrative embodiments stop energy transfer immediately.

Illustrative embodiments also maintain a buffer energy level in the battery equal to a defined vehicle travel time (e.g., one hour). If illustrative embodiments determine that the destination of the user-specified trip for the electric vehicle is within the predefined time period, then illustrative embodiments utilize the electric vehicle as a relay node in the ad hoc wireless mesh network of electric vehicles. If all electric vehicles in the ad hoc wireless mesh network have a sufficient amount of battery power (e.g., greater than a defined minimum battery power threshold level such as 65%), then illustrative embodiments can transfer battery power to an energy storage grid for storage. In other words, the ad hoc wireless mesh network of electric vehicles can be coupled with a nearby energy storage grid. The energy storage grid can be comprised of buildings, light poles, traffic signals, electric signs, and the like with energy storage capacity (e.g., batteries). Illustrative embodiments can utilize the energy storage grid to wirelessly recharge a battery of an electric vehicle when possible.

Illustrative embodiments can also apply this ad hoc wireless network to smart buildings when, for example, a power outage occurs due to adverse weather conditions, downed power lines, or the like. For example, during a power outage, illustrative embodiments can form an ad hoc wireless network between nearby smart buildings to wirelessly share energy.

Furthermore, illustrative embodiments can take into account the surroundings as factors when determining energy transfer. For example, illustrative embodiments can provide as input to the machine learning model the destination of the electric vehicle, the distance to be covered in the next predefined time period, and information regarding the surroundings of the electric vehicle during the distance to be covered in the next predefined time period. The machine learning model utilizes this input to determine source and sink nodes. A source node is any node in the ad hoc wireless mesh network that has a battery power level greater than the defined minimum battery power level. A sink node is any node in the ad hoc wireless mesh network that has a battery power level less than the defined minimum battery power level. For example, if the electric vehicle is near a smart building (e.g., a hospital) experiencing a power outage, then the machine learning model can provide an output value that forms an ad hoc wireless mesh network with the electric vehicle as a source energy node and the smart building as a sink energy node.

As a result, illustrative embodiments are capable of wirelessly transferring energy between batteries of electric vehicles or smart buildings in an ad-hoc manner. In addition, by utilizing machine learning models, illustrative embodiments can predict battery energy levels needed to achieve specific needs and predict safety levels to prevent battery overheating. Thus, illustrative embodiments provide intelligent wireless energy sharing via an ad hoc wireless mesh network comprising electric vehicles, smart buildings, or a combination thereof.

Thus, illustrative embodiments provide one or more technical solutions that overcome a technical problem with a current an inability of electric vehicles and smart buildings to wirelessly share energy during, for example, battery power shortages, power loss, or the like. As a result, these one or more technical solutions provide a technical effect and practical application in the field of wireless energy transfer.

With reference now to FIG. 2, a diagram illustrating an example of an electric vehicle wireless energy transfer system is depicted in accordance with an illustrative embodiment. Electric vehicle wireless energy transfer system 201 may be implemented in a computing environment, such as computing environment 100 in FIG. 1. Electric vehicle wireless energy transfer system 201 is a system of hardware and software components for intelligent wireless energy sharing between electric vehicles.

In this example, electric vehicle wireless energy transfer system 201 includes electric vehicle 202 and electric vehicle 204. Electric vehicle 202 may be, for example, electric vehicle 107 in FIG. 1. Electric vehicle 204 may be, for example, one of other electric vehicles 103 in FIG. 1. However, it should be noted that electric vehicle wireless energy transfer system 201 is intended as an example only and not as a limitation on illustrative embodiments. For example, electric vehicle wireless energy transfer system 201 can include any number and type of electric vehicles.

Electric vehicle 202 includes battery 206 and electric vehicle 204 includes battery 208. In this example, battery 206 has a battery power level greater than a defined minimum battery power threshold level (e.g., 65%) and battery 208 has a battery power level less than the defined minimum battery power threshold level. Also, it should be noted that electric vehicle 202 and electric vehicle 204 are stationary for a certain amount of time at a traffic signal, in a parking lot, or the like.

Electric vehicle 202 includes computer 210, such as, for example, computer 101 in FIG. 1. Computer 210 includes machine learning (ML) models 212. Machine learning models 212 can be implemented in, for example, wireless energy transfer management code 200 in FIG. 1. Machine learning models 212 include, for example, one machine learning model for predicting the amount of battery power needed by electric vehicle 202 based on the distance electric vehicle 202 needs to travel in a predefined time period (e.g., one hour) during a trip and another machine learning model for predicting the heat resistance capacity of battery 206.

Based on the predictions of machine learning models 212, computer 210 determines that electric vehicle 202 can share energy with electric vehicle 204. Thus, in this example, computer 210 forms an ad hoc wireless mesh network between electric vehicle 202 and electric vehicle 204 with electric vehicle 202 being a source energy node and electric vehicle 204 being a sink energy node. Computer 210 utilizes electrical coil 214 to generate electromagnetic field 216. It should be noted that electric vehicle 204 is within range of electromagnetic field 216. In addition, computer 210 utilizes transceiver 218 to wirelessly transmit energy from electric vehicle 202. Electric vehicle 204 utilizes transceiver 220 to receive the energy wirelessly transmitted from electric vehicle 202 to increase the battery power level of battery 208.

Further, electric vehicle 202 includes radiation sensor 222. Computer 210 utilizes radiation sensor 222 to monitor the amount of electromagnetic radiation being generated during the wireless energy transfer to electric vehicle 204. If radiation sensor 222 detects that the amount of electromagnetic radiation being generated is greater than a defined maximum electromagnetic radiation threshold level, then computer 210 immediately stops the wireless energy transfer from electric vehicle 202 to electric vehicle 204.

Figure 3:
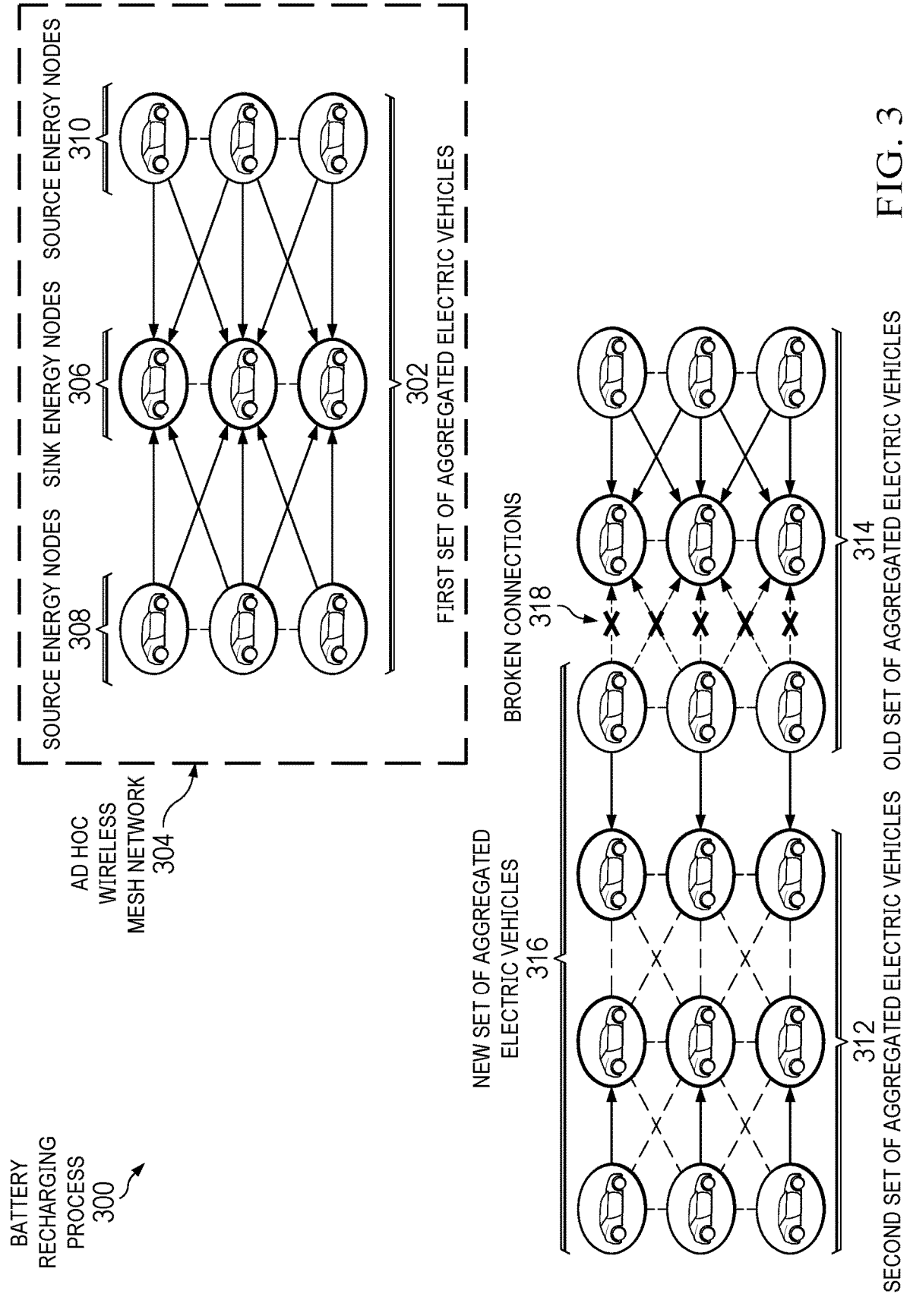
FIG. 3 is a diagram illustrating an example of a battery recharging process in accordance with an illustrative embodiment.

With reference now to FIG. 3, a diagram illustrating an example of a battery recharging process is depicted in accordance with an illustrative embodiment. Battery recharging process 300 may be implemented in a computing environment, such as computing environment 100 in FIG. 1.

In this example, battery recharging process 300 includes first set of aggregated electric vehicles 302, which forms ad hoc wireless mesh network 304 at time t1. First set of aggregated electric vehicles 302 includes sink energy nodes 306, source energy nodes 308, and source energy nodes 310. Sink energy nodes 306 have low battery power levels (i.e., less than a defined minimum battery power threshold level). Source energy nodes 308 and source energy nodes 310 have battery power levels greater than the defined minimum battery power threshold level. Each of sink energy nodes 306 can wirelessly receive battery recharging from multiple source energy nodes simultaneously.

At time t2, second set of aggregated electric vehicles 312 joins first set of aggregated electric vehicles 302 to form old set of aggregated electric vehicles 314, which is the same as first set of aggregated electric vehicles 302, and new set of aggregated electric vehicles 316 based on broken connections 318. As a result, neighboring electric vehicles in new set of aggregated electric vehicles 316 start wirelessly transferring energy to certain electric vehicles in old set of aggregated electric vehicles 314 since those electric vehicles have already transferred energy to other electric vehicles at time t1. This reorientation of aggregated electric vehicles is based on the output of machine learning models that take as input second set of aggregated electric vehicles 312 and recalculate the position of source energy nodes and sink energy nodes.

Figure 4:
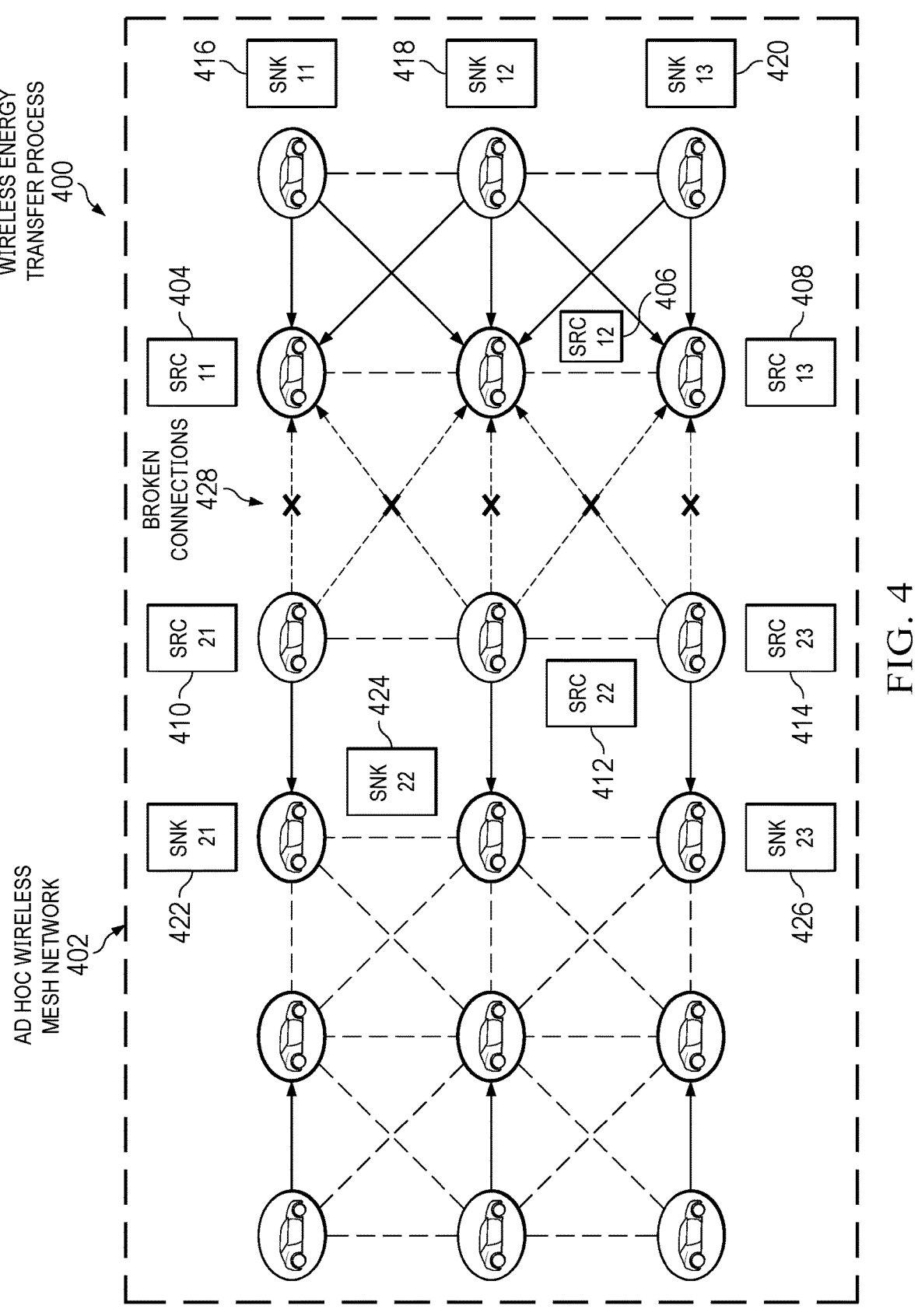
FIG. 4 is a diagram illustrating an example of a wireless energy transfer process in accordance with an illustrative embodiment.

With reference now to FIG. 4, a diagram illustrating an example of a wireless energy transfer process is depicted in accordance with an illustrative embodiment. Wireless energy transfer process 400 is implemented in ad hoc wireless mesh network 402.

For wireless transfer of energy, the energy flows from a source energy node having sufficient battery charge (i.e., greater than a defined minimum battery charge threshold level) to a sink energy node having insufficient battery charge (i.e., less than the defined minimum battery charge threshold level). In this example, SRC11 404, SRC12 406, SRC13 408, SRC21 410, SRC22 412, SRC23 414 are source energy nodes. In contrast, SNK11 416, SNK12 418, SNK13 420, SNK21 422, SNK22 424, and SNK23 426 are sink energy nodes. For a sink energy node, illustrative embodiments can calculate energy received as, for example:

$$\text{SNK11 } 416 = \text{SRC11 } 404 * edge * t + \text{SRC12 } 406 * edge * t + \text{SRC21 } 410 * edge * t.$$

At time Δt, other Δx electric vehicles are added and SRC21 410 now stops energy sharing with SNK11 416 and starts wireless energy sharing with SNK21 422.

$$\text{SNK11 416}=(\text{SRC11 404}-\Delta\text{SRC})*\text{edge}*(t+\Delta t)+$$
$$(\text{SRC12 406}-\Delta\text{SRC})*\text{edge}*(t+\Delta t)+\text{SRC21}$$
$$\text{410}*\text{edge}*t.$$

$$\text{SNK21 422}=(\text{SRC21 410}-\Delta\text{SRC})*\text{edge}*t.$$

Similarly, at 428, old wireless energy transfer connections are broken, and new wireless energy transfer connections are created as per the position of sink energy nodes and their energy needs. As a result, illustrative embodiments make multiple energy transfer connections and disconnections in ad hoc wireless mesh network 402 without any dependency on any one particular node. Illustrative embodiments calculate the number of energy transfer hops between nodes based on the position of the sink energy nodes.

Illustrative embodiments utilize an energy transfer loss function to manage energy loss by restricting the number of energy transfer hops between nodes. Energy transferred is defined as: $f(x,n)=(0.9x)^n$, where "x" is the number of nodes and "n" is number of hops. Energy transfer loss function is defined as: $1(x)=1-f(x,n)$. An electric vehicle will act as a relay node when its battery power level is less than the defined minimum battery power threshold level (e.g., 65%) and its destination is within the predefined time period (e.g., one hour).

In this example, assume no other electric vehicles are added at time t3. As a result, at the end of time t3, all electric vehicles have some level of battery charge and none of the electric vehicles are sink energy nodes.

With reference now to FIGS. 5A-5B, a diagram illustrating an example of an electric vehicle energy sharing process is depicted in accordance with an illustrative embodiment. Electric vehicle energy sharing process 500 starts at 502, where electric vehicle 504 stops at, for example, a traffic signal with other electric vehicles for a certain amount of time. At 506, any such aggregation of electric vehicles can produce an ad hoc wireless mesh network where successful sharing of energy can occur.

At 508, illustrative embodiments utilize an energy transfer loss function to restrict the number of node hops during wireless energy transfer between electric vehicles. At 510, if electric vehicles are within electromagnetic field range, then the electric vehicles can share energy wirelessly. At 512, the wireless energy transfer of illustrative embodiments follows IEEE guidelines. As a result, if the electromagnetic radiation level is greater than the defined maximum electromagnetic radiation threshold level, then the electric vehicles stop energy transfer immediately.

At 514, a first machine learning model predicts an amount of energy needed by electric vehicle 504 based on the distance electric vehicle 504 needs to travel in the next predefined time period (e.g., one hour) or the distance to its destination, whichever is less. For training the first machine learning model, illustrative embodiments utilize historical energy usage data, such as, for example, the average distance traveled by electric vehicle 504 against different levels of battery charge.

At 516, a second machine learning model predicts the heat resistance capacity of the battery of electric vehicle 504. For training the second machine learning model, illustrative embodiments utilize historical battery heat data, such as, for example, the average heat generated by the battery of electric vehicle 504 against different levels of battery charge.

Transceiver 518 provides wireless energy transfer for electric vehicle 504. At 520, illustrative embodiments utilize the second machine learning model to predict the amount of heat generated by the battery of electric vehicle 504 during the trip. The second machine learning model compares the predicted amount of heat generated by the battery during the trip to a defined maximum battery heat threshold level. If the second machine learning model determines that the predicted amount of heat generated by the battery during the trip exceeds the defined maximum battery heat threshold level, then illustrative embodiments start a cooling period with gradual battery discharging, which can act as an energy source for other electric vehicles in the ad hoc wireless mesh network.

At 522, alternative sources of wireless energy transfer to the aggregation of electric vehicles can be from nearby smart buildings, light poles, electric signs, and the like. At 524, electric vehicle 504 maintains a buffer energy level (e.g., an hour of travel time). Electric vehicle 504 can drop out of the ad hoc wireless mesh network when its travel destination is within the hour of travel time buffer energy level. Alternatively, electric vehicle 504 can lower the defined minimum battery power threshold level from, for example, 65% to 50% as the travel destination gets closer. The lower battery power threshold level would enable electric vehicle 504 to divert extra power from electric vehicle 504 to other needed areas such as a building during, for example, a power outage.

At 526, if all electric vehicles in the ad hoc wireless mesh network have excess energy (e.g., greater than the defined minimum battery power threshold level), then the electric vehicles can transfer the excess energy to a nearby energy storage grid. At 528, electric vehicle 504 arrives at its travel destination without charging at a wired charging station.

With reference now to FIG. 6, a diagram illustrating an example of a smart building wireless energy transfer system is depicted in accordance with an illustrative embodiment. Smart building wireless energy transfer system 600 may be implemented in a computing environment, such as computing environment 100 in FIG. 1. Smart building wireless energy transfer system 600 is a system of hardware and software components for intelligent wireless energy sharing between smart buildings.

In this example, smart building wireless energy transfer system 600 includes smart house 602 and smart house 604. However, it should be noted that smart building wireless energy transfer system 600 is intended as an example only and not as a limitation on illustrative embodiments. For example, smart building wireless energy transfer system 600 can include any number and type of smart buildings.

Smart house 602 includes battery 606 and smart house 604 includes battery 608. In this example, battery 606 has a battery power level greater than a defined minimum battery power threshold level (e.g., 65%) and battery 608 has a battery power level less than the defined minimum battery power threshold level.

Smart house 602 includes computer 610, such as, for example, computer 101 in FIG. 1. Computer 610 includes machine learning (ML) models 612. Machine learning models 612 can be implemented in, for example, wireless energy transfer management code 200 in FIG. 1. Machine learning models 612 include, for example, one machine learning model for predicting the amount of battery power needed by smart house 602 based on the historic average daily energy needs of smart house 602 and another machine learning model for predicting the heat resistance capacity of battery 606.

Based on the predictions of machine learning models 612, computer 610 determines that smart house 602 can share energy with smart house 604. Thus, in this example, computer 610 forms an ad hoc wireless mesh network between smart house 602 and smart house 604 with smart house 602 being a source energy node and smart house 604 being a sink energy node. Computer 610 utilizes electrical coil 614 to generate electromagnetic field 616. It should be noted that smart house 604 is within range of electromagnetic field 616. In addition, computer 610 utilizes transceiver 618 to wirelessly transmit energy from smart house 602. Smart house 604 utilizes transceiver 620 to receive the energy wirelessly transmitted from smart house 602 to increase the battery power level of battery 608.

Further, smart house 602 includes radiation sensor 622. Computer 610 utilizes radiation sensor 622 to monitor the amount of electromagnetic radiation being generated during the wireless energy transfer to smart house 604. If radiation sensor 622 detects that the amount of electromagnetic radiation being generated is greater than a defined maximum electromagnetic radiation threshold level, then computer 610 immediately stops the wireless energy transfer from smart house 602 to smart house 604.

Figure 7B:
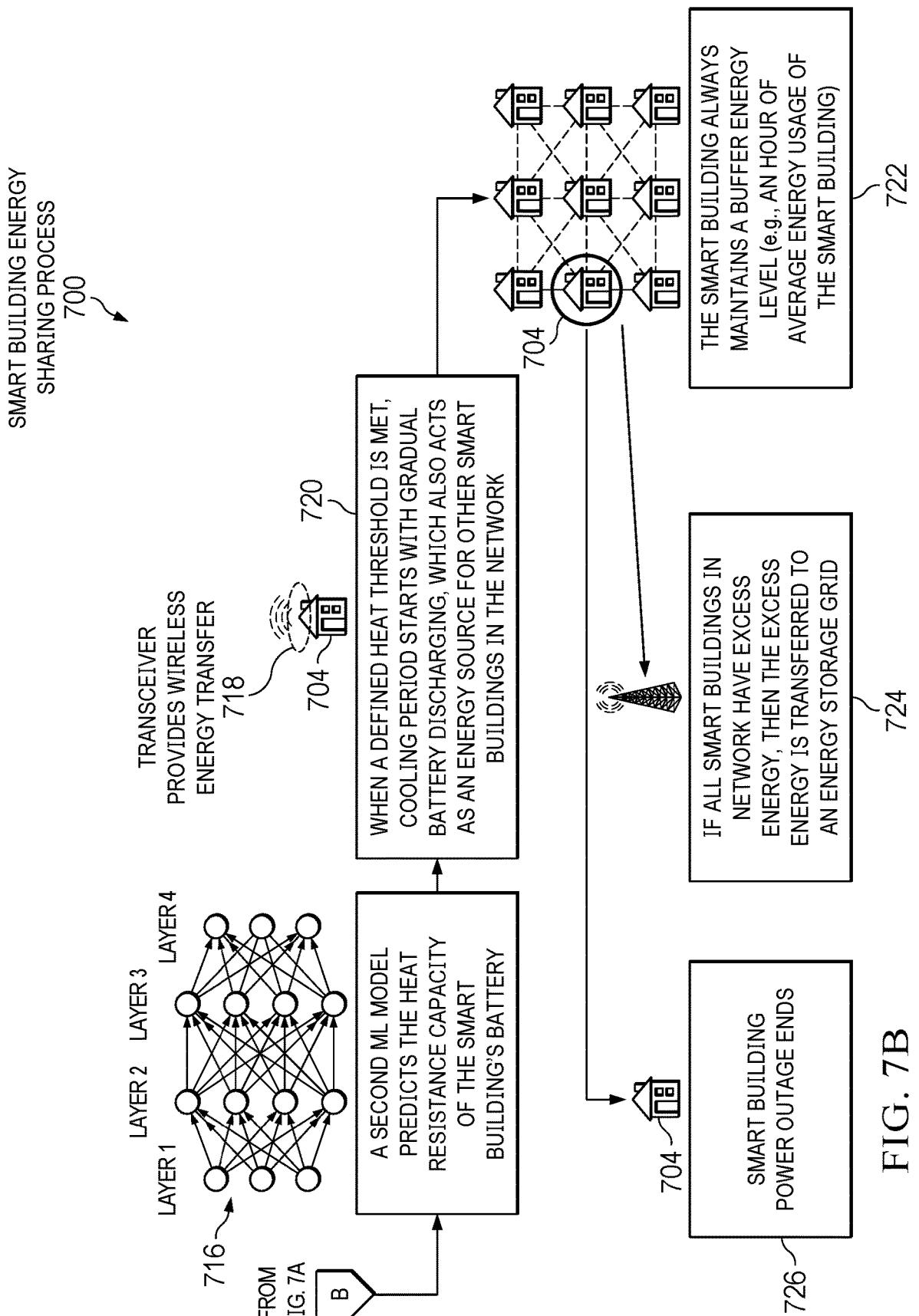

With reference now to FIGS. 7A-7B, a diagram illustrating an example of a smart building energy sharing process is depicted in accordance with an illustrative embodiment. Smart building energy sharing process 700 starts at 702, where smart building 704 is experiencing a power outage due to, for example, adverse weather conditions or disaster. At 706, an aggregation of smart buildings can produce an ad hoc wireless mesh network where successful sharing of energy can occur.

At 708, illustrative embodiments utilize an energy transfer loss function to restrict the number of node hops during wireless energy transfer between smart buildings. At 710, if smart buildings are within electromagnetic field range, then the smart buildings can share energy wirelessly. At 712, the wireless energy transfer of illustrative embodiments follows IEEE guidelines. As a result, if the electromagnetic radiation level is greater than the defined maximum electromagnetic radiation threshold level, then the smart buildings stop energy transfer immediately.

At 714, a first machine learning model predicts the amount of energy needed by smart building 704 based on historic daily energy needs of smart building 704. Illustrative embodiments train the first machine learning model utilizing historical energy usage data, such as, for example, the average daily energy usage of smart building 704.

At 716, a second machine learning model predicts the heat resistance capacity of the battery of smart building 704. Illustrative embodiments train the second machine learning model utilizing historical battery heat data, such as, for example, the average heat generated by the battery of smart building 704 against different levels of battery charge.

Transceiver 718 provides wireless energy transfer for smart building 704. At 720, illustrative embodiments utilize the second machine learning model to predict an amount of heat generated by the battery of smart house 704. The second machine learning model compares the predicted amount of heat generated by the battery to a defined maximum battery heat threshold level. If the second machine learning model determines that the predicted amount of heat generated by the battery exceeds the defined maximum battery heat threshold level, then illustrative embodiments start a cooling period with gradual battery discharging, which can act as an energy source for other smart buildings in the ad hoc wireless mesh network.

At 722, smart building 704 maintains a buffer energy level (e.g., an hour of average energy usage of smart building

704). At 724, if all smart buildings in the ad hoc wireless mesh network have excess energy (e.g., greater than the defined minimum battery power threshold level), then the smart buildings can transfer the excess energy to a nearby energy storage grid. At 726, power outage ends for smart building 704.

With reference now to FIG. 8, a flowchart illustrating a process for intelligent wireless energy sharing is shown in accordance with an illustrative embodiment. The process shown in FIG. 8 may be implemented in a computer, such as, for example, computer 101 in FIG. 1. For example, the process shown in FIG. 8 may be implemented in wireless energy transfer management code 200 in FIG. 1.

The process begins when the computer of an energy node, using a set of machine learning models, forms an ad hoc wireless mesh network that includes a plurality of energy nodes (step 802). The plurality of energy nodes is comprised of the energy node and a set of other energy nodes. Also, the plurality of energy nodes is stationary for a certain amount of time within a defined range that allows wireless energy transfer.

In response to forming the ad hoc wireless mesh network, the computer of the energy node, using the set of machine learning models, identifies a source energy node and a sink energy node in the plurality of energy nodes based on at least one of a distance the energy node needs to travel in a predefined time period, current energy level of the energy node, current energy levels of the set of other energy nodes, heat resistance capacity of each of the plurality of energy nodes, and an amount of energy loss during the wireless energy transfer (step 804). The source energy node is the energy node having its current energy level greater than a defined minimum energy threshold level. The sink energy node is one of the set of other energy nodes having its current energy level less than the defined minimum energy threshold level.

Further, the computer of the energy node, using the set of machine learning models, identifies a set of relay energy nodes acting as an energy relay between the energy node as the source energy node and the sink energy node in the plurality of energy nodes to wirelessly transfer energy from the energy node as the source energy node to the sink energy node (step 806). The set of relay energy nodes have current energy levels less than the defined minimum energy threshold level and travel destinations within the predefined time period. The computer of the energy node utilizes an energy transfer loss function to restrict a number of the set of relay energy nodes. The computer of the energy node, utilizing a transceiver, transfers the energy wirelessly from the energy node as the source energy node to the sink energy node via the ad hoc wireless mesh network using the set of relay energy nodes (step 808).

The computer of the energy node, using a radiation sensor, detects that an electromagnetic radiation level is greater than a defined maximum electromagnetic radiation threshold level while wirelessly transferring the energy from the energy node as the source energy node to the sink energy node (step 810). The computer of the energy node stops the wireless energy transfer from the energy node as the source energy node to the sink energy node in response to detecting that the electromagnetic radiation level is greater than the defined maximum electromagnetic radiation threshold level (step 812). Thereafter, the process terminates.

Thus, illustrative embodiments of the present disclosure provide a computer-implemented method, computer system, and computer program product for intelligent wireless energy sharing between nodes of an ad hoc wireless mesh network. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for intelligent wireless energy sharing, the computer-implemented method comprising:

forming, by a computer of an energy node, using a set of machine learning models, an ad hoc wireless mesh network that includes a plurality of energy nodes, the plurality of energy nodes is comprised of the energy node and a set of other energy nodes;

identifying, by the computer of the energy node, using the set of machine learning models, a source energy node and a sink energy node in the plurality of energy nodes in response to forming the ad hoc wireless mesh network;

identifying, by the computer of the energy node, using the set of machine learning models, a set of relay energy nodes acting as an energy relay between the energy node as the source energy node and the sink energy node in the plurality of energy nodes to wirelessly transfer the energy from the energy node as the source energy node to the sink energy node, wherein the set of relay energy nodes have current energy levels less than a defined minimum energy threshold level and travel destinations within a predefined time period, and wherein the computer of the energy node utilizes an energy transfer loss function to restrict a number of the set of relay energy nodes when the current energy levels are less than the defined minimum energy threshold level and the travel destinations are within the predefined time period; and transferring, by the computer of the energy node, utilizing a transceiver, energy wirelessly from the energy node as the source energy node to the sink energy node via the ad hoc wireless mesh network using the set of relay energy nodes.

2. The computer-implemented method of claim 1, further comprising:

detecting, by the computer of the energy node, using a radiation sensor while wirelessly transferring the energy from the energy node as the source energy node to the sink energy node, that an electromagnetic radiation level is greater than a defined maximum electromagnetic radiation threshold level; and stopping, by the computer of the energy node, wireless energy transfer from the energy node as the source energy node to the sink energy node in response to detecting that the electromagnetic radiation level is greater than the defined maximum electromagnetic radiation threshold level.

3. The computer-implemented method of claim 1, wherein the plurality of energy nodes is a plurality of electric vehicles.

4. The computer-implemented method of claim 3, wherein the plurality of electric vehicles is stationary for a certain amount of time within a defined range that allows wireless energy transfer.

5. The computer-implemented method of claim 1, wherein the plurality of energy nodes is a plurality of smart buildings, and further comprising:

a first machine learning model of the set of machine learning models predicts an amount of battery power needed by at least one of the plurality of smart buildings based on historic data energy needs of the at least one of the plurality of smart buildings; and a second machine learning model of the set of machine learning models predicts a heat resistance capacity of a battery associated with the at least one of the plurality of smart buildings.

6. The computer-implemented method of claim 1, wherein the computer of the energy node, using the set of machine learning models, identifies the source energy node and the sink energy node in the plurality of energy nodes based on at least one of a distance the energy node needs to travel in a predefined time period, current energy level of the energy node, current energy levels of the set of other energy nodes, heat resistance capacity of each of the plurality of energy nodes, and an amount of energy loss during wireless energy transfer.

7. The computer-implemented method of claim 1, wherein the source energy node is the energy node having its current energy level greater than a defined minimum energy threshold level and the sink energy node is one of the set of other energy nodes having its current energy level less than the defined minimum energy threshold level.

8. The computer-implemented method of claim 1, wherein the computer of the energy node transfers battery power from the energy node to an energy storage grid for storage in response to the plurality of energy nodes in the ad hoc wireless mesh network having a sufficient amount of battery power greater than a defined minimum battery power threshold level.

9. A computer of an energy node for intelligent wireless energy sharing, the computer comprising:

a communication fabric;

a storage device connected to the communication fabric, wherein the storage device stores program instructions; and a processor connected to the communication fabric, wherein the processor executes the program instructions to:

form, using a set of machine learning models, an ad hoc wireless mesh network that includes a plurality of energy nodes, the plurality of energy nodes is comprised of the energy node and a set of other energy nodes;

identify, using the set of machine learning models, a source energy node and a sink energy node in the plurality of energy nodes in response to forming the ad hoc wireless mesh network;

identify, using the set of machine learning models, a set of relay energy nodes acting as an energy relay between the energy node as the source energy node and the sink energy node in the plurality of energy nodes to wirelessly transfer the energy from the energy node as the source energy node to the sink energy node, wherein the set of relay energy nodes have current energy levels less than a defined minimum energy threshold level and travel destinations within a predefined time period, and wherein the computer of the energy node utilizes an energy transfer loss function to restrict a number of the set of relay energy nodes when the current energy levels are less than the defined minimum energy threshold level and the travel destinations are within the predefined time period; and transfer, utilizing a transceiver, energy wirelessly from the energy node as the source energy node to the sink energy node via the ad hoc wireless mesh network using the set of relay energy nodes.

10. The computer of the energy node of claim 9, wherein the processor further executes the program instructions to:

detect, using a radiation sensor while wirelessly transferring the energy from the energy node as the source energy node to the sink energy node, that an electromagnetic radiation level is greater than a defined maximum electromagnetic radiation threshold level; and stop wireless energy transfer from the energy node as the source energy node to the sink energy node in response to detecting that the electromagnetic radiation level is greater than the defined maximum electromagnetic radiation threshold level.

11. A computer program product for intelligent wireless energy sharing, the computer program product comprising a computer-readable storage medium having program instructions embodied therewith, the program instructions executable by a computer of an energy node to cause the computer to:

form, using a set of machine learning models, an ad hoc wireless mesh network that includes a plurality of energy nodes, the plurality of energy nodes is comprised of the energy node and a set of other energy nodes;

identify, using the set of machine learning models, a source energy node and a sink energy node in the plurality of energy nodes in response to forming the ad hoc wireless mesh network;

identify, using the set of machine learning models, a set of relay energy nodes acting as an energy relay between the energy node as the source energy node and the sink energy node in the plurality of energy nodes to wirelessly transfer the energy from the energy node as the source energy node to the sink energy node, wherein the set of relay energy nodes have current energy levels less than a defined minimum energy threshold level and travel destinations within a predefined time period, and wherein the computer of the energy node utilizes an energy transfer loss function to restrict a number of the set of relay energy nodes when the current energy levels are less than the defined minimum energy threshold level and the travel destinations are within the predefined time period; and transfer, utilizing a transceiver, energy wirelessly from the energy node as the source energy node to the sink energy node via the ad hoc wireless mesh network using the set of relay energy nodes.

12. The computer program product of claim 11, wherein the program instructions further cause the computer of the energy node to:

detect, using a radiation sensor while wirelessly transferring the energy from the energy node as the source energy node to the sink energy node, that an electromagnetic radiation level is greater than a defined maximum electromagnetic radiation threshold level; and stop wireless energy transfer from the energy node as the source energy node to the sink energy node in response to detecting that the electromagnetic radiation level is greater than the defined maximum electromagnetic radiation threshold level.

13. The computer program product of claim 11, wherein the plurality of energy nodes is a plurality of electric vehicles.

14. The computer program product of claim 13, wherein the plurality of electric vehicles is stationary for a certain amount of time within a defined range that allows wireless energy transfer.

* * * * *